United States Patent [19]
Mould

[11] 4,082,461
[45] Apr. 4, 1978

[54] OPTICAL SLIT CONTROL APPARATUS

[75] Inventor: Henry Manifold Mould, Buckinghamshire, England

[73] Assignee: Perkin-Elmer Limited, Beaconsfield, England

[21] Appl. No.: 744,361

[22] Filed: Nov. 23, 1976

[30] Foreign Application Priority Data

Nov. 28, 1975 United Kingdom ............... 48909/75

[51] Int. Cl.² .............................................. G01J 3/04
[52] U.S. Cl. ................................... 356/100; 350/271
[58] Field of Search .................... 350/271; 356/96, 97, 356/99–101

[56] References Cited

U.S. PATENT DOCUMENTS

| | | | |
|---|---|---|---|
| 2,587,451 | 2/1952 | Farrand | 356/101 |
| 3,160,697 | 12/1964 | Jacobs et al. | 356/100 X |
| 3,462,227 | 8/1969 | Tipotsch | 356/100 |
| 3,489,496 | 1/1970 | Hashizume | 356/100 X |

Primary Examiner—F. L. Evans
Attorney, Agent, or Firm—S. A. Giarratana; F. L. Masselle; E. T. Grimes

[57] ABSTRACT

Apparatus for controlling the width of an adjustable slit in response to the product of two variable functions, one of which is programmed, which includes at least one adjustable optical slit; slit width programming apparatus for producing a first displacement that is a logarithmic function of the instantaneous slit width conforming to a predetermined program; antilogarithm generating elements for producing a second displacement that is the antilogarithm of the first displacement; a phase adjusting mechanism for controlling the phasing between the first displacement and the second displacement; slit width selection apparatus operative on the phase adjusting mechanism for controlling the phasing in accordance with a given slit width selection; and actuating elements responsive to the second displacement and operative on the optical slit for controlling its width.

18 Claims, 2 Drawing Figures

OPTICAL SLIT CONTROL APPARATUS

BACKGROUND OF THE INVENTION

This invention relates to systems for the width control of an adjustable optical lit in response to the product of variable functions, one of which is programmed, such as in a monochromator forming a part of a spectrophotometer or like instrument, an infrared spectrophotometer in particular, wherein provision is included for multiplying an instantaneous programmed slit width by a variable factor under the control of the operator. It is desirable to meet the following practical requirements by a slit width control system incorporated in an infrared spectrophotometer.

In a spectrophotometer, the monochromator serves to analyze the wavelengths of the radiation transmitted, or absorbed, by a sample under analysis. The radiation beam passing through the monochromator is geometrically defined by an entry slit and an exit slit, usually integrated in a slit assembly for practical convenience. Each slit is formed by a pair of jaws, one of which at least may be displaced to control the slit width in accordance with certain operational requirements. The two slits are usually ganged for operation in concert.

Increasing the width of both slits naturally allows more energy to pass through to the detector and, consequently, the signal-to-noise ratio of the detector output is improved, but at the cost of reduced resolution. The right compromise between resolution and signal-to-noise ratio depends to a great extent on the circumstances of the analysis being performed, and this means that the operator must be provided with means for adjusting the slit width either in predetermined selectable steps or continuously.

Monochromators may be arranged to scan in the direction of either increasing or decreasing wavelength. If the slits are kept at the same width during the entire scan, the energy reaching the detector must vary as the scan proceeds, because of the wavelength dependent characteristics of the optical elements. This impairs the photometric accuracy, because of the inevitable lowering of the signal-to-noise ratio, as less energetic regions of the spectrum are scanned. Programming of the slit width for constant energy at the detector is a known and accepted way of overcoming this problem.

The need may now be appreciated for means enabling the operator's slit width control to be superimposed on the automatic control. In effect, this means that the programmed slit width must be multiplied by a factor which may vary either continuously or in steps, depending on whether the spectrophotometer design is such that the operator may select any control setting of his choice in a given range or only certain prededetmined settings.

Now, a slit program must naturally account for the grating constant and the angle of blaze of the grating in use and, in addition, the optical efficiencies of the other elements forming part of the photometric system of the spectrophotometer. In multi-grating instruments, this is taken care of by having multi-track slit control cams, each track being designed in relation to one grating. Where one grating is used in more than one order, each order must likewise be associated with its own track.

A mechanical complication arises in multiplying the displacement of the slit-cam follower by the factor referred to earlier. In some heretofore known spectrophotometers, linkages have been used involving variable fulcrum levers. Such linkages are comparatively simple and inexpensive to produce, but do not allow accurate multiplication and are only tolerably satisfactory within a comparatively narrow range.

It is, of course, well known in spectrophotometry that the ordinate of the recorded spectrum may be given in either transmission or absorption values and the abscissa in either wavelength or wavenumber values. In the present specification, the scanning function of the monochromator will be referred to, while assuming a wavenumber presentation of the abscissa, which is the one most commonly used in infrared instruments. For simplicity, the wavenumber scan will be referred to, although the monochromator in fact scans the wavelength of the radiation emerging from the sample. It must be understood, however, that the wavelength presentation is not excluded from within the scope of the present invention.

Normally, the use of multi-track slit control cams, as in known spectrophotometer monochromators, involved a design compromise brought about by the step-like change in the profile between the outgoing track and the incoming track at the grating or order change. In prior art slit control systems, the change was allowed to take place by actuating the scan drive through a small angle, after temporarily immobilizing the pen servo, and the chart drive, of course. Now, if the angle was made too small, the slit-cam follower could only negotiate the step between the two tracks in the forward scan drive but not in the reverse drive, which was an unacceptable limitation in a commercial instrument. If the angle was made too large, so much of the cam profile was used up that the incoming track had to be given an undesirably high rate of profile change if the scan was to be resumed either from the wavenumber reached just before a change was commanded or from a value slightly higher to ensure a small overlap region (it is assumed in the latter case, the pen servo was to be reactivated to coincide with the repassing of said value upon resumption of the wavenumber scan). The time taken to effect the change has always been, of course, another important factor. Ideally, it should be very brief, but the considerable inertia of the scan drive system has meant that hitherto changeover times in terms of seconds rather than fractions of a second have had to be tolerated.

SUMMARY OF THE INVENTION

An object of the present invention is to provide improved systems for controlling the width of an optical slit in response to the product of two variable functions one of which is programmed and improved monochromators incorporating said systems.

According to the present invention, in one form thereof, there is provided a system for controlling the width of an adjustable optical slit in response to the product of two variable functions, one of which is programmed, comprising:

A. at least one adjustable optical slit;
B. slit width programming means for producing a first displacement that is a logarithmic function of the instantaneous slit width conforming to a predetermined program;
C. antilogarithm-generating means for producing a second displacement that is the antilogarithm of said first displacement;
D. phase adjusting means for enabling the phasing between said first displacement and said second displacement to be controlled;

E. slit width selection means operative on said phase adjusting means for controlling said phasing in accordance with a given slit width selection; and F. actuating means responsive to said second displacement and operative on said slit for controlling its width.

The slit width programming means may advantageously be arranged in the form of a rotary log cam representing the log of the programmed variable function over a predetermined range thereof. In this specification, the term "log" means logarithmic or logarithm. In the specific application of the invention to a monochromator forming part of a spectrophotometer, said log cam may correspond to the log of the slit width required to maintain constant energy at the detector through a complete wavenumber scan and may be rotated by the wavenumber drive of the spectrophotometer.

If this programmed function calls for abrupt changes in the cam contour, as many tracks as there are such changes may be provided in said cam, each track being matched to a particular portion of the entire range of said function. Reverting to the specific application referred to above, if the monochromator design requires one or more grating changes (or grating order changes) to cover the full wavenumber scan range, said log cam may be provided with as many tracks as there are such changes, each logarithmic track profile being matched to the grating or order associated with it.

A notable feature of the present invention is the provision of a pair of track portions per function step-change, so arranged that a cam follower may be made to contact one of the other portions through a simple changeover mechanism. The operation is best understood with reference to a spectrophotometric application, wherein a function step-change is identified with a grating change. The leading portion of a pair of tracks is selected to be operative during a first part of the wavenumber range covered by one grating and the remaining portion is introduced in the second part of said range in readiness for a grating change, when the abrupt slit width change that must accompany it is effected by switching over the cam follower onto the leading track portion of the next pair of track portions serving the incoming grating, while both wavenumber drive and pen servo are stationary for a brief instant. Since it is the cam follower to be displaced and not the slit cam to be rotated by the wavenumber drive, the design compromise referred to hereinbefore with respect to the prior art is completely avoided and the changeover time is reduced to a fraction of a second.

The antilogarithm generating means may be arranged in the form of an antilog cam adapted to displace a follower arm representing a part of said actuating means, the displacement of said follower arm being transmitted to a mechanism for altering the width of the monochromator slits.

The phase adjusting means may be arranged in the form of a differential mechanism enabling the log cam follower to transmit motion to the antilog cam and at the same time enabling the slit width selection means to advance or retard the motion according to a chosen setting of said selection means, which includes a neutral setting whereat neither advance nor retard is introduced. A preferred differential mechanism includes a steel cord, or the like, which is arranged to translate a rotary angle of said log cam follower into a rotary angle of the antilog cam, the cord passing over a pulley assembly that is pivotable in response to a setting of the slit width selection means to increase or decrease said rotary angle of the antilog cam so as to cause the antilog cam to acquire a phase lead or a phase lag, respectively.

The slit width selection means may be a cam provided with either a continuous or a stepper profile, depending on whether the spectrophotometer is designed to enable the operator to select any slit width of his choice, or only certain slit widths included in a predetermined range. In the aforesaid preferred differential mechanism, the slit width selection cam controls the angle through which said pulley assembly pivots.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other structures for carrying out the purposes of the invention. It is important, therefore, that this disclosure be regarded as including such equivalent constructions as to not depart from the spirit and scope of the invention.

One embodiment of the invention has been chosen for purposes of illustration and description, and is shown in the accompanying drawings forming a part of the specification.

DETAILED DESCRIPTION OF THE PREFERRED EMBODIMENT

Figure 1:
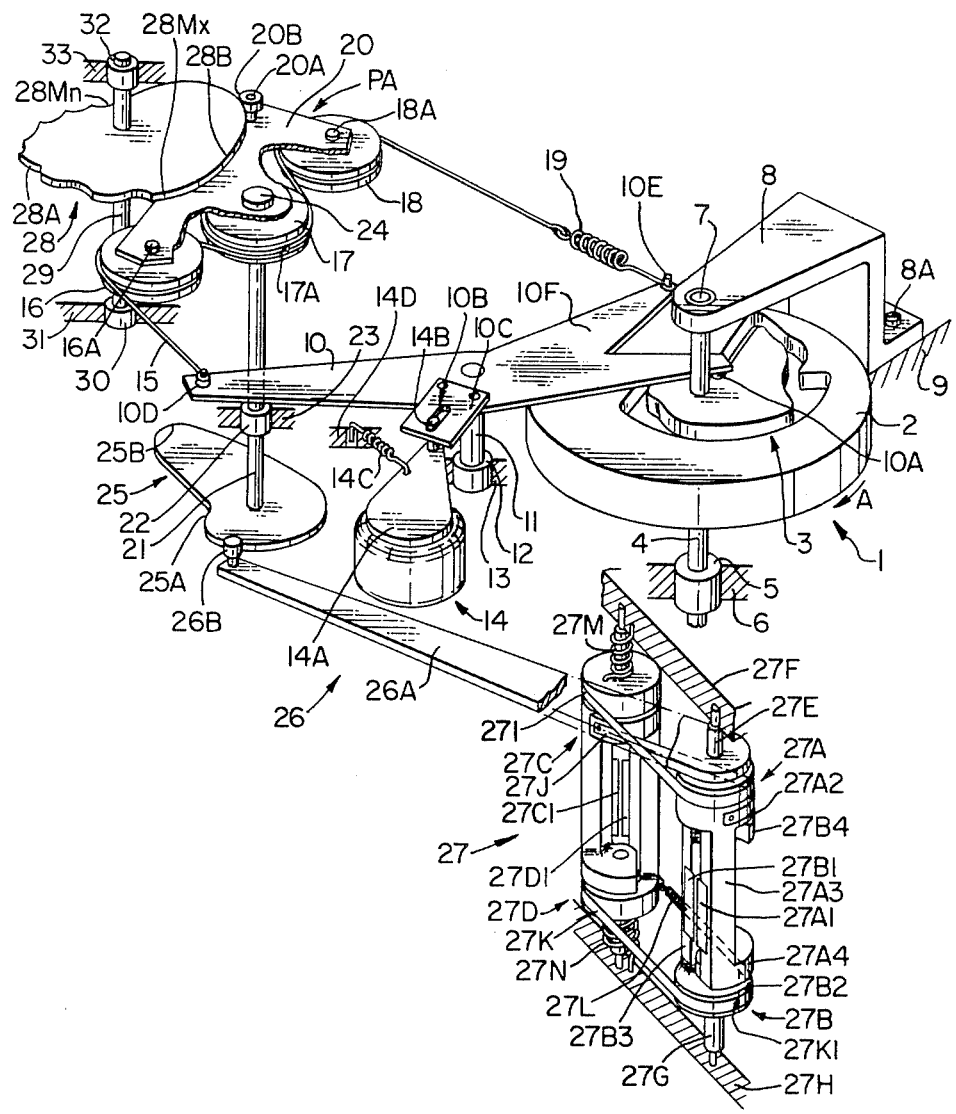
FIG. 1 is a perspective diagrammatic view of apparatus for controlling the slit width in a four grating monochromator forming part of an infrared spectrophotometer.

In the embodiment of the invention illustrated in FIG. 1, a multitrack log cam 1 comprises an aluminum disc 2 of substantial thickness, through one face of which a continuous groove 3 of constant depth and variable width has been milled around the disc center. The upright walls of groove 3 define four logarithmic tracks, one track matching one particular grating. Each track comprises one portion extending over the outer wall of groove 3, so that two successive operative track portions of one wall are separated by an unused track portion.

The disc 2 is keyed to a shaft 4, journaled in bearing 5, supported by the machine frame as indicated at 6 and in bearing 7 supported by bracket 8 fixed to the frame as at 9 by screws such as 8A.

The shaft 4 is coupled to the wavenumber drive (not illustrated) of the spectrophotometer and, as seen in FIG. 1, is intended to be rotated in a clockwise direction, as denoted by arrow A, when the spectrophotometer is used in the forward scanning mode.

Figure 2:
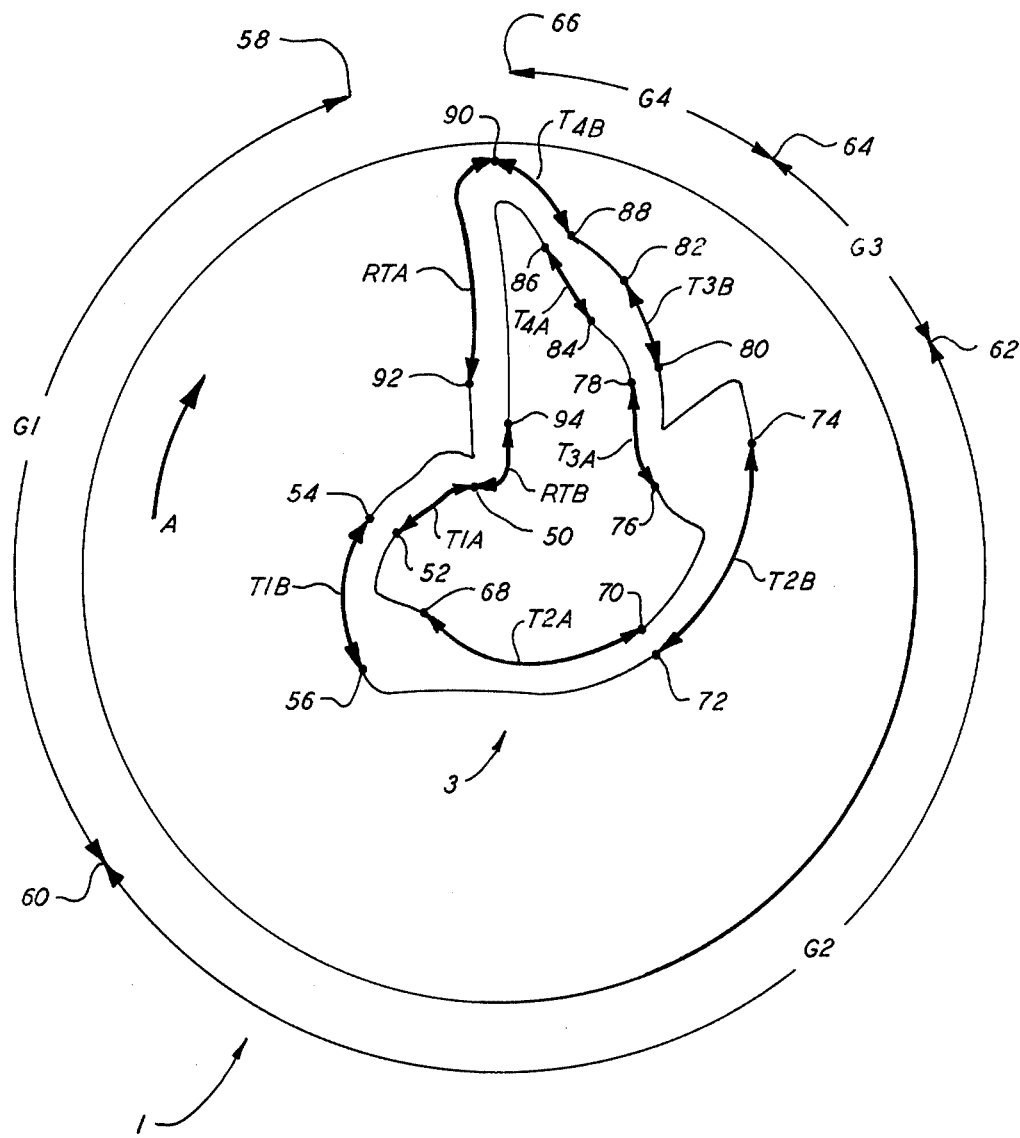
FIG. 2 is a plan view of the log cam of FIG. 1.

FIG. 2 shows the log cam 1 of FIG. 1 in plan view. It identifies the operative tracks and relates them to the four gratings in terms of wavenumbers within the full scan range. It also identifies the return track that comes into operation at the end of a scan.

In FIG. 2, track No. 1 includes a first portion T1A extending on the inner wall of the groove 3 from the 4000cm$^{-1}$ mark indicated at 50 to the 3289cm$^{-1}$ mark indicated at 52, and a second portion T1B extending on the outer wall of the groove 3 from 3289cm$^{-1}$ indicated at 54 to 1980cm$^{-1}$ indicated at 56. The two track portions T1A and T1B are operative when grating G1 has been selected. The gratings are indicated by the letter G and a number denoting the sequence of use, coupled with an arrow-headed circular sector defining the wavenumber limits of the range covered by the gratings. Thus, grating G1 extends from 4000cm$^{-1}$ indicated at 58 to 1980cm$^{-1}$ indicated at 60, and grating G2 extends from 1980cm$^{-1}$ indicated at 60 to 630cm$^{-1}$ indicated at 62, while grating G3 extends from 630cm$^{-1}$ indicated at 62 to 330cm$^{-1}$ indicated at 64. Grating G4 extends from 330cm$^{-1}$ indicated at 64 to 180cm$^{-1}$ indicated at 66.

Still referring to FIG. 2, track No. 2, which is associated with grating G2, comprises track portion T2A extending from 1980cm$^{-1}$ indicated at 68 to 1004cm$^{-1}$ indicated at 70 on the inner wall, followed by track portion T2B extending from 1004cm$^{-1}$ indicated at 72 to 630cm$^{-1}$ indicated at 74 on the outer wall. Track No. 3, which is operative when grating G3 has been selected, includes track portion T3A on the inner wall extending from 630cm$^{-1}$ indicated at 76 to 444cm$^{-1}$ indicated at 78, followed by track portion T3B on the outer wall extending from 444cm$^{-1}$ indicated at 80 to 330cm$^{-1}$ indicated at 82. Track No. 4, which is operative when grating G4 has been selected includes track portion T4A on the inner wall extending from 330cm$^{-1}$ indicated at 84 to 214cm$^{-1}$ indicated at 88 to 180cm$^{-1}$ indicated at 90. The end of track No. 4 at 180cm$^{-1}$ indicated at 90 extends into a return track comprising a portion RTA on the outer wall of groove 3 up to 4180cm$^{-1}$ indicated at 92 and a portion RTB on the inner wall from 4180cm$^{-1}$ indicated at 94 back to the scan origin at 4000cm$^{-1}$ indicated at 50.

It will be appreciated that during the course of a complete scan, eight track portions are used in succession and that each grating is associated with a pair of track portions, the leading member of the pair being on the inner wall of the groove 3 and the other member being on the outer wall. The tracks cooperate with a cam follower device, as will be described more fully hereinafter. The working end of the cam follower must switch back and forth between the inner and outer walls to bear against the track portions, as follows: track portion T1A from 50 to 52; track portion T1B from 54 to 56; track portion T2A from 68 to 70; track portion T2B from 72 to 74; track portion T3A from 76 to 78; track portion T3B from 80 to 82; track portion T4A from 84 to 86; track portion T4B from 88 to 90. The portion RTA extends from 90 to 92 and the portion RTB extends from 94 to 50. It is noted that the end of portion TRA and the beginning of portion TRB are shown in FIG. 2 as being staggered since the cam follower device will actually trace an oblique path because of the way in which it is mounted and the steepness of the return portion of the groove 3.

An electromagnetic actuator, as will be described hereinafter, is used to alternate the cam follower device from one to the other operative position, and to lessen the positional criticality at each changeover coinciding with a grating change, each outgoing track may be extended to cover a few wavenumbers below those indicated and the associated incoming track may be made to commence a few wavenumbers above those indicated. In this way, an overlap region of, say, 10 wavenumbers is created which can be served by either track. As long as the changeover takes place within that region, the continuity of the slit width program is maintained.

The use of both walls for defining one track enables an important advantage to be realized, as the steep track profile gradient met at the grating changeover does not need to be negotiated by rotating the wavenumber drive through a small scan angle while the recording pen servo is immobilized. All that is required is to introduce a brief pause in the operation of the wavenumber drive and the pen servo, while the cam follower device is switched over.

Reverting to FIG. 1, the cam follower device comprises a follower arm 10 fixed at its mid-section to a stub shaft 11, rotatable in bearing 12, supported in the machine frame as indicated at 13. Fastened to one end of the follower arm 10 is a follower pin 10A, the diameter of which is designed to be accommodated with minimum clearance within the narrowest section of groove 3 so as to render insignificant the photometric disturbance caused when the pin moves from one to the other portion of a cam track.

The electromagnetic actuator referred to earlier is represented by a rotary solenoid 14, provided with an actuator arm 14A, mounting an upright pin 14B located in a slot 10B of the projection 10C of the follower arm 10. A tension spring 14C, anchored to the frame at 14D biases the arm 14A in a counterclockwise direction when the rotary solenoid 14 is de-energized, thus urging the follower pin 10A towards the inner wall of the groove 3 of the log cam 1. When the rotary solenoid 14 is energized, the action of spring 14C is overcome and the follower pin 10A is urged against the outer wall of the groove 3. The operation of the solenoid 14 is commanded through the control logic of the spectrophotometer, responding to the instantaneous position of the wavenumber scan drive. Since FIG. 1 depicts a scan start situation and the first track portion to be operative is found on the inner wall of groove 3 in log cam 1, as was indicated hereinbefore in connection with FIG. 2, the solenoid 14 as shown in FIG. 1 is de-energized.

To the end of follower arm 10 opposite follower pin 10A a post 10D is attached to act as an anchoring device for one end of a steel cord 15, which is led over a first pulley 16 in a clockwise direction, then three turns around drum 17 in a counterclockwise direction, with the mid-turn fastened to the drum at 17A, and then over another pulley 18 in a clockwise direction, before being attached to one end of tension spring 19, the other end of which is fastened to a post 10E mounted on a projection 10F of the follower arm 10.

Pulleys 16 and 18 are rotatably mounted in a plate 20 around fixed posts 16A and 18A, respectively, and form with it a pulley assembly indicated at PA. Drum 17 is keyed to shaft 21 which is rotatable in bearing 22 supported on a part of the frame 23 and in a second bearing, not shown. The upper end of shaft 21 is extended to receive the inner race of a pair of ball races 24, the outer race being secured in plate 20 so that the assembly PA as a whole is supported by, but free to rotate relative to, the shaft 21. Fixed to the lower end of the shaft 21 is an antilog cam 25 having an active profile portion extending counterclockwise from 25A to 25B, as shown in FIG. 1. Said cam 25 cooperates with a follower arm 26 comprising a follower arm 26A pivotally mounted at one of its ends and having a roller 26B for following the contour of the cam 25 at the other end. The angular displacement of the arm 26A caused by the rotation of the cam 25 is transmitted to an assembly 27, which includes a pair of adjustable monochromator slits and a mechanism for altering the slit width responsive to the angle turned by the arm 26A.

The slit assembly 27 comprises a first pair of rotatable slit jaw carriers 27A and 27B, hereinafter simply referred to as carriers, mounting jaws 27A1 and 27B1, respectively, which define the entry slit of a monochromator, and a second pair of similar carriers 27C and 27D mounting jaws 27C1 and 27D1, respectively, which define the exit slit of said monochromator.

Both members of the first pair of carriers are rotatable around an upper post 27E fixed to the frame at 27F and a lower post 27G fixed to the frame at 27H, the two posts being arranged coaxially.

The carrier 27A may, for example, be milled out of a solid aluminum rod, integrally to define: a cylindrical body 27A2, axially bored to receive post 27E and forming a pivotal connection therewith; a longitudinal peripheral limb 27A3 to which the slit jaw 27A1 is attached; and a terminal cylindrical sector 27A4, bored to receive the post 27G and form a pivotal connection therewith.

The rotatable carrier 27B is generally similar to the carrier 27A and likewise comprises a cylindrical body 27B2 merging with a longitudinal peripheral limb 27B3 expanding into a cylindrical sector 27B4. The two carriers are made to interfit for rotation within a common notional cylindrical shell, the body 27A2 overlying the sector 27B4 and the sector 27A4 overlying the body 27B2. The inwardly facing contour of the cylindrical sectors are so shaped that each carrier may be rotated through a maximum predetermined angle without the cylindrical sector of one carrier interfering with the peripheral limb of the other carrier.

The second pair of carriers is generally similar to, but not identical with, the first pair. The differences are minor and may be easily appreciated from inspection of FIG. 1.

The rotary motion imparted to the carrier 27A by any angular displacement of the follower 26, produced by the antilog cam 25, is transmitted without reversal of direction to the carrier 27C by a flexible metal band 27I, the ends of which are each suitably fastened to the associated carrier. The same rotary motion is transmitted from carrier 27A to carrier 27D by a second flexible metal band 27J, except that this time, the direction of rotation is reversed by arranging the band to lap the two carriers in S-fashion, the ends being again each fastened to the associated carrier. The third flexible metal band 27K links in motion carriers 27B and 27D, the band being made to wrap around the cylindrical bodies of the two carriers with its two ends urged towards each other by an intervening tension spring 27L. The band 27K is pinned at a suitable point such as at 27K1 to each of the two cylindrical bodies to prevent slippage. Similarly, to band 27I, band 27K does not reverse the direction of the transmitted motion between the two carriers.

Carriers 27C and 27D are both biased in a clockwise direction, the first by torsion spring 27M and the second by torsion spring 27N. It can now be appreciated that the torque exerted by the torsion spring 27M is transmitted via the band 27I to the carrier 27A and, consequently, the follower 26 attached to it is urged against the antilog cam 25. At the same time, slit jaws 27A1 and 27C1 are urged towards the "closed" position as far as the particular angular position of the antilog cam 25 will allow.

Torsion spring 27N urge the carrier 27D and, through the band 27K, the carrier 27B in a clockwise direction, with the result that both slit jaws 27D1 and 27B1 are urged towards the "open" position, the torque however being resisted by the band 27J which stays taut because of the action of spring 27M. Only when the follower 26 urges the jaws 27A1 and 27C1 to open may the jaws 27B1 and 27D1 open by an equal amount.

The cooperation of the springs and the bands, as described, provides a backlash-free actuating mechanism, which responds to the angular displacement of the follower 26 by simultaneously causing the two monochromator slits to acquire an identical width that is substantially proportional to said angular displacement, the jaws defining each slit being made to open or close symmetrically with respect to the line of contact, or near contact, of said jaws when fully closed.

Plate 20 of the rotatable pulley assembly PA carries a post 20A, mounting a rotatable follower 20B, shown in abutment with the edge of a rotary slit width selection cam 28, keyed to shaft 29, rotatable in bearing 30, supported in the frame at 31 and in bearing 32, supported in the frame at 33. The cam 28 is provided with a number of lobes, such as 28A, easily distinguished from the gently arcuating dead region 28B of the cam profile, which performs no selection function. In its position as depicted in FIG. 1, the rotatable follower 20B bears on the dead region 28B of the cam 28, which means that the operator has not yet selected a desired slit width to be superimposed on the slit program "stored" in log cam 1. At this time, the arrangement, comprising the follower arm 10, the steel cord 15, the pulley assembly PA, the drum 17 and the spring 19, merely serves to transmit rotary motion from the follower arm 10 to the antilog cam 25 and, in so far as controlling the slit width in assembly 27 is concerned, exactly the same result could be achieved by means of a linear cam (instead of the log cam 1) directly driving the slit width adjusting mechanism. However, the benefit of this arrangement is effected when the cam 28 is rotated to cause one of the lobes 28A to come into contact with the follower 20B. The lobes are, in fact, produced at different radii, i.e., maximum and minimum radii occurring at 28Mx and 28Mn, respectively, and the one selected by turning the cam 28 will cause the assembly PA to rotate bodily by an angle proportional to the change in the lobe radius. If the radius is greater than that "seen" by the follower 20B in the situation depicted in FIG. 1, the assembly PA will turn clockwise, and if it is smaller the assembly will turn counterclockwise. The effect of turning the assembly PA is to introduce a phase shift in the rotary motion transferred between the follower arm 10 and the antilog cam 25, the shift tending to advance the antilog cam if the assembly PA is moved clockwise from the position shown in FIGS. 1A, 1B and 1C and vice versa if the assembly is moved counterclockwise, because this arrangement represents, in fact, a differential mechanism.

The profile of the antilog cam 25 is extended at both ends beyond the limits that would be adequate if the cam 28 was never moved from the position shown in FIG. 1. If one regards the operation of the FIG. 1 layout with the cam 28 at its inactive position as the "in phase" operation, a phase change introduced by causing one of the lobes 28A to abut against the follower 20B merely shifts the datum of the slit program, a phase lead causing the program to commence with a greater slit width compared with the "in phase" operation and a phase lag introducing a smaller initial slit width. The "in phase" operation introduces no shift.

It should be clear from the foregoing that the embodiment described with reference to FIG. 1 removes the need for compromise between the dynamic range and the computational accuracy that is found in prior art arrangements. Both the log cam and the antilog cam may be easily designed to maintain the same degree of tracking accuracy throughout any range that might be required in the design of a spectrophotometer. The differential mechanism, for its part, has no inherent range limitation and can be easily built to achieve and maintain more than adequate accuracy within the design range. Its function is to effectively add to or subtract from (through the phase lead and phase lag, respectively) the log of the instantaneous programmed slit width, the log of the multiplication factor selected by the operator, whereas the antilog cam 25 converts the sum or difference in the value representing the selected slit width added to or subtracted from the programmed slit width.

There has thus been described a new and improved apparatus for controlling the width of an adjustable slit in response to the product of two variable functions, one of which is programmed, which maintains greater computational accuracy over the entire dynamic range while extending the range to meet the performance requirements of the instrument, as compared to such prior art apparatus. Although a specific embodiment has been illustrated and described, it will be obvious to those skilled in the art that various modifications may be made without departing from the spirit of the invention, which is intended to be limited solely by the appended claims.

What is claimed is:

1. Apparatus for controlling the width of an adjustable slit in response to the product of two variable functions, one of which is programmed, comprising:
   at least one adjustable optical slit means; slit width programming means for producing a first displacement that is a logarithmic function of the instantaneous slit width conforming to a predetermined program;
   antilogarithm generating means for producing a second displacement that is the antilogarithm of said first displacement;
   phase adjusting means for controlling the phasing between said first displacement and said second displacement;
   slit width selection means operative on said phase adjusting means for controlling said phasing in accordance with a given slit width selection; and
   actuating means responsive to said second displacement and operative on said slit means for controlling its width.

2. Apparatus according to claim 1 wherein said slit width programming means comprises a rotary logarithmic cam corresponding to the programmed variable function over a predetermined range.

3. Apparatus according to claim 2 wherein said cam comprises a plurality of tracks, each of said tracks corresponding to a preselected portion of the entire range of said programmed function, the number of said tracks being determined by the number of abrupt changes in the cam contour as required by the programmed function.

4. Apparatus according to claim 3 wherein said slit width programming means further comprises a cam follower, and a changeover mechanism, each of said tracks having a pair of track portions, said track portions being disposed so that said cam follower contacts one or the other of said portions depending on the operational state of said changeover mechanism.

5. Apparatus according to claim 1 wherein said antilogarithm generating means is an antilogarithmic cam.

6. Apparatus according to claim 5 wherein said actuating means includes follower means and a mechanism for altering the width of said slit means, said follower means being disposed so as to be displaced by said antilogarithmic cam, and being connected to said mechanism for altering the width of the slit means.

7. Apparatus according to claim 1 wherein
   said slit width programming means comprises a logarithmic cam corresponding to the programmed variable function over a predetermined range, and a cam follower; and wherein
   said antilogarithm generating means comprises an antilogarithmic cam; and wherein
   said phase adjusting means comprises differential means for enabling the logarithmic cam follower to transmit motion to the antilogarithmic cam and and at the same time enabling said slit width selection means to advance or retard the motion according to a preselected setting of said slit selection means.

8. Apparatus according to claim 7 wherein said differential means comprises a flexible cord arranged to translate a rotary angle of said logarithmic cam follower into a rotary angle of the antilogarithmic cam, a pulley assembly over which said cord passes, said pulley assembly being pivotable in response to a setting of the slit width selection means to increase or decrease the rotary angle of the antilogarithmic cam so as to cause the antilogarithmic cam to acquire a phase lead or a phase lag with respect to the logarithmic cam.

9. Apparatus according to claim 1 wherein said slit width selection means comprises a cam.

10. Apparatus according to claim 8 wherein said slit width selection means comprises a cam for controlling the angle through which said pulley assembly pivots.

11. Apparatus according to claim 1 wherein said apparatus forms part of the monochromator of a spectrophotometer.

12. Apparatus according to claim 6 wherein said apparatus forms part of the monochromator of a spectrophotometer.

13. Apparatus for controlling the width of an adjustable slit in response to the product of two variable functions, one of which is programmed, comprising:
   at least one adjustable optical slit;
   slit width programming means for producing a first displacement that is a logarithmic function of the instantaneous slit width conforming to a predetermined program, said programming means including a rotary logarithmic cam corresponding to the programmed variable function over a predetermined range, said cam having a plurality of tracks, each of the tracks corresponding to a preselected portion of the entire range of said programmed function, the number of said tracks being determined by the number of abrupt changes in the cam contour as required by the programmed function, a cam follower, and a changeover mechanism, each of said tracks having a pair of track portions, said track portions being disposed so that said cam follower contacts one or the other of said portions by means of said changeover mechanism;

antilogarithm generating means for producing a second displacement that is the antilogarithm of said first displacement, said generating means including an antilogarithmic cam;

phase adjusting means for controlling the phasing between said first displacement and said second displacement;

slit width selection means operative on said phase adjusting means for controlling said phasing in accordance with a given width selection;

actuating means responsive to said second displacement and operative on said slit means for controlling its width;

said actuating means including a follower arm, and a mechanism for altering the width of said slit, said follower arm being disposed so as to be displaced by said antilogarithmic cam, and means for transmitting the displacement of said follower arm to said mechanism for altering the width of the slit;

said phase adjusting means including differential means for enabling the logarithmic cam follower to transmit motion to the antilogarithmic cam and at the same time enabling said slit width selection means to advance or retard the motion according to a preselected setting of said selection means.

14. In a monochromator forming part of a spectrophotometer, apparatus for controlling the width of an adjustable slit in response to the product of two variable functions, one of which is programmed to maintain constant energy at a detector through a complete wavenumber scan, comprising:

at least one adjustable optical slit;

slit width programming means for producing a first displacement that is a logarithmic function of the instantaneous slit width conforming to a predetermined program, said slit width programming means comprising a logarithmic cam co-operating with a logarithmic cam follower, said logarithmic cam corresponding to the programmed variable function over a predetermined range and including a plurality of tracks, each of said tracks corresponding to a preselected portion of the entire range of said programmed function, the number of said tracks being determined by the number of abrupt changes in the cam contour as required by the number of grating or grating order changes to cover the full wavenumber scan range;

antilogarithm generating means for producing a second displacement that is the antilogarithm of said first displacement;

phase adjusting means for controlling the phasing between said first displacement and said second displacement;

slit width selection means operative on said phase adjusting means for controlling said phasing in accordance with a given slit width selection; and actuating means responsive to said second displacement and operative on said slit for controlling its width.

15. Apparatus according to claim 14 wherein said antilogarithm generating means for producing a second displacement includes an antilogarithm cam, and wherein said actuating means includes a follower arm and a mechanism for altering the width of said slit, said follower arm being disposed so as to be displaced by said antilogarithmic cam, and means for transmitting the displacement of said follower arm to said mechanism for altering the width of the salt.

16. Apparatus according to claim 15 wherein said phase adjusting means includes differential means for enabling the logarithmic cam follower to transmit motion to the antilogarithmic cam and at the same time enabling said slit width selection means to advance or retard the motion according to a preselected setting of said selection means.

17. Apparatus according to claim 16 wherein said differential means comprises a flexible cord arranged to translate a rotary angle of said logarithmic cam follower into a rotary angle of the antilogarithmic cam, a pulley assembly over which said cord passes, said pulley assembly being pivotable in response to a setting of the slit width selection means to increase or decrease the rotary angle of the anti-logarithmic cam so as to cause the antilogarithmic cam to acquire a phase lead or a phase lag with respect to the logarithmic cam.

18. Apparatus according to claim 17 wherein said slit width selection means comprises a cam for controlling the angle through which said pulley assembly pivots.

* * * * *